United States Patent
Haynes (10) Patent No.: US 9,039,321 B2
(45) Date of Patent: May 26, 2015

(54) CONTRACTION JOINT INSTALLER FOR CONCRETE SLABS

(71) Applicant: Harvey Hilbert Haynes, Oakland, CA (US)

(72) Inventor: Harvey Hilbert Haynes, Oakland, CA (US)

( * ) Notice: Subject to any disclaimer, the term of this patent is extended or adjusted under 35 U.S.C. 154(b) by 0 days.

(21) Appl. No.: 14/158,025

(22) Filed: Jan. 17, 2014

(65) Prior Publication Data

US 2014/0205378 A1 Jul. 24, 2014

Related U.S. Application Data

(60) Provisional application No. 61/754,419, filed on Jan. 18, 2013.

(51) Int. Cl.
*E01C 23/02* (2006.01)
*B23D 1/08* (2006.01)
*E01C 11/10* (2006.01)

(52) U.S. Cl.
CPC ............. *E01C 23/026* (2013.01); *E01C 11/106* (2013.01); *B23D 1/08* (2013.01)

(58) Field of Classification Search
CPC .......... E01C 11/06; E01C 23/026; B23D 1/08
USPC .......................................... 404/64, 87, 89, 93
See application file for complete search history.

(56) References Cited

U.S. PATENT DOCUMENTS

| | | | |
|---|---|---|---|
| 1,178,700 A | 4/1916 | Baker | |
| 1,697,563 A | 1/1929 | Heltzel | |
| 1,740,345 A | 12/1929 | Heltzel | |
| 1,997,216 A | 4/1935 | Heltzel | |
| 2,025,449 A * | 12/1935 | Heltzel | 404/74 |
| 2,354,586 A * | 7/1944 | Fischer | 404/74 |
| 2,806,414 A | 9/1957 | Woodman | |
| 3,194,130 A | 7/1965 | Guntert | |
| 3,200,482 A * | 8/1965 | Brown | 29/235 |
| 3,413,901 A * | 12/1968 | Lusk | 404/87 |
| 3,422,734 A * | 1/1969 | Tonjes et al. | 404/87 |
| 3,478,655 A | 11/1969 | Rasmussen | |
| 3,495,509 A | 2/1970 | Lusk | |
| 3,570,379 A * | 3/1971 | Johnson | 404/87 |
| 3,648,575 A | 3/1972 | Rasmussen | |
| 4,008,974 A | 2/1977 | Miers | |
| 4,128,358 A | 12/1978 | Compton | |
| 4,190,997 A | 3/1980 | Holt | |
| 4,194,282 A * | 3/1980 | Byrd, Jr. | 29/451 |
| 4,765,771 A * | 8/1988 | Howsley | 404/74 |
| 5,582,899 A | 12/1996 | Chiuminatta et al. | |
| 6,990,972 B2 | 1/2006 | Markley | |
| 7,334,962 B1 | 2/2008 | Shaw et al. | |
| 7,381,007 B2 | 6/2008 | Shaw et al. | |

OTHER PUBLICATIONS

Zip Strip Contraction Joint Former, Brock White Construction Materials website, Jun. 18, 2014, 1 page. (Known to the applicant's attorney at least as early as 1980.).

* cited by examiner

*Primary Examiner* — Raymond W Addie
(74) *Attorney, Agent, or Firm* — James R. Cypher; Charles R. Cypher (57) ABSTRACT

An apparatus and method to install contraction joints in concrete slabs. The method uses a device, which inserts a strip of plastic or paper tape into freshly laced concrete, as the device is driven across a concrete slab. The tape is folded immediately prior to being inserted into freshly placed concrete, and functions to weaken the slab at the contraction joint location for the purpose of causing a crack to form in the slab. Plastic tape can be used, which functions as a moisture vapor retarder, and thereby, protects floor coverings from moisture damage, such as mold and mildew, at contraction joint locations.

32 Claims, 11 Drawing Sheets

CONTRACTION JOINT INSTALLER FOR CONCRETE SLABS

BACKGROUND OF INVENTION

The present invention relates to creating discontinuities in the upper portion of concrete slabs, also known as contraction joints. In particular, the present invention provides for inserting a flexible material such as tape into the upper portion of a plastic concrete slab to create a contraction joint.

Contraction joints serve the purpose of controlling the location of cracks in concrete slabs due to thermal and drying shrinkage behavior of concrete. The joints weaken the slab so cracks occur at the joint locations, and in, this manner, minimize the occurrence of random cracks. Conventional knowledge proposes that the depth of contraction joints should be one-fourth the thickness of the slab, and spacing of the joints to range from 24 to 36 times the thickness of the slab.

Several methods of installing contraction joints are currently in use by the construction industry. The oldest method uses a grooving tool to create a score line or joint in a slab. Typically grooving tools are employed for small slabs such as sidewalks. Inserting strips of wood, plastic, or metal to function as contraction joints is also standard, but problems occur when the strips are not installed vertically, which happens when aggregate particles obstruct insertion. Also, strips that are not pushed flush or below the surface can interfere with finishing the surface of the concrete. The method of inserting materials for contraction joints is usually limited to medium sized slabs, such as residential house slabs and small warehouses.

Today, the most common method of installing contraction joints is by saw cutting. The original saw cutting method used water-cooled saw blades, where it was necessary to allow the concrete to develop sufficient strength, prior to saw cutting, in order for aggregate particles to resist raveling along the edges of the saw cut. A time delay was required before saw cutting to allow concrete to develop strength, and in many cases, this delay permitted random cracks to develop before the contraction joints were installed. The newer saw cutting method, called early entry saw cutting (U.S. Pat. No. 5,582,899 "Concrete Surface with Early Cut Grooves" by Chiuminatta, Dec. 10, 1996) uses a machine that allows cutting of the concrete immediately after final finishing operations. Cutting concrete at this early age has successfully minimized random cracks because the joints were installed before thermal contraction or drying shrinkage of concrete occurred. Limitations with the method are the slow process of saw cutting concrete and the high expense of diamond blades. The installed cost of contraction joints made according to the present invention is less than half that of using the method of early entry saw cutting.

A common problem exists with many of the prior art methods of creating contraction joints. Cracks that occur at contraction joint locations are paths for moisture from below the slab to the surface. If floor covering, such as sheet vinyl, carpet, or wood, are used, then a problem can occur by the presence of moisture under the slab. One common problem in the house building industry is related to vinyl floor coverings bonded to concrete slabs by latex adhesive. At contraction joint locations, where moisture from the sand or soil below the slab can easily rise up through the crack in the slab, an environment is created for mold growth on the underside of the vinyl. The same situation can occur with carpet and wood, but wood is also vulnerable to expansion and warping by absorbing moisture. To prevent moisture from damaging the floor coverings, contraction joints need to be filled, typically with epoxy or polyurethane materials. This operation is time consuming and expensive. The current invention eliminates the expense of filling contraction joints.

Prior art methods of inserting flexible materials into fresh concrete are reviewed herein. The most relevant patents were by J. N. Heltzel. The first patent was U.S. Pat. No. 1,697,563, "Concrete Surfacing Joint and Means for and Method of Forming the Same", issued Jan. 1, 1929. The method used a mandrel to push into plastic concrete a flexible material to form a contraction joint. Discrete lengths of strip material are laid out on the surface of the concrete slab and then a mandrel pushes the strip of material into the concrete using vibration or jarring action. This is a step-by-step process of inserting discrete lengths of material into the concrete. The method required "water-proof paper, fabric, rubber, sheet metal, or other easily bendable material," but all the materials had to be water-proof because the material was laid out on the fresh concrete prior to being pushed into the concrete; and, if non-waterproof paper were used, the paper would absorb water and be too weak to resist the action of insertion. The current invention overcomes these limitations by using a rotating insertion blade to fold the material immediately prior to insertion into the concrete; hence, non-waterproof paper can be used and a continuous operation can occur by using an "endless" strip of material that is supplied by a spool carried on the device.

The second patent by Heltzel was U.S. Pat. No. 1,740,345, "Traffic Line and Joint Machine and Method of Producing Same", issued Dec. 17, 1929. This invention describes a large machine that spans highway pavement for inserting long strips of material into the pavement. The machine can install longitudinal and transverse joints. A rotating blade is used to form a slot in the plastic concrete followed by separate operations where a strip of material is laid out over the slot and then a long mandrel blade is used to push the material into the concrete. The flexible material is mounted on a roll. In contrast, the current invention continuously installs a strip of material into concrete. The rotating insertion blade pushes the tape into the concrete in one operation, which eliminates the separate operations, required by Heltzel's device, of creating a slot in the concrete and then laying out the strip of material, and then inserting the material into the concrete.

The third patent by Heltzel, U.S. Pat. No. 1,997,216, "Method of and Means for Producing Concrete Surfacing Joints", issued Apr. 9, 1935, provided for manually cutting a slot in plastic concrete by using a rotating blade. After cutting the slot, in a separate operation material is laid over the slot, and then the rotating blade is used to insert the material into the concrete. Three operations were required. The current invention uses one operation to insert an "endless" strip of material into concrete for the contraction joint.

Later art by Gunert, U.S. Pat. No. 3,194,130, "Apparatus for Forming a Weakened Zone in Pavements", issued Jul. 13, 1965, describes a large machine that continuously creates a slot in plastic concrete and inserts material fed off of a roll. The insertion material is stiff in its vertical orientation and flexible in its horizontal orientation. The slot is formed by two blades, which are spaced such that the insertion material is run between these blades in its vertical orientation as it is embedded into the concrete. The material is not folded, as is the case for the current invention. The machine is used only for forming contraction joints in the longitudinal direction of pavements. No method was described to form joints transverse to the longitudinal joints.

L. A. Shaw and R. D. Shaw received patents that use a folded strip of material for contraction joints, U.S. Pat. Nos. 7,334,962 and 7,381,007, issued Feb. 26, 2008 and Jun. 3, 2008, respectively. Their method installs taut wires in a form over which is hung flexible material. This operation occurs prior to casting concrete. The folded material forms the contraction joint. These patents do not cover the current invention, which inserts material into concrete after placement.

SUMMARY OF THE INVENTION

The present invention provides an installer, a connection made with that installer for continuously inserting tape, wound on a roll, below a top surface of a plastic concrete slab. The installer is made up of a base that is formed so as to be able be supported by and to travel over the top surface of the plastic concrete slab, a rotating insertion blade supported by the base, the rotating insertion blade reaching below the base, the rotating insertion blade having an edge, and a fork supported by the base, the fork being located above the rotating insertion blade, the fork having an opening that can receive an axle on which the tape wound on the roll may be received. Preferably, the fork need only be located higher than the axis of the insertion blade to be located above the insertion blade.

In the preferred embodiment the opening in the fork for supporting the axle is a slot that allows the height of the axle to change depending on the size of the roll of tape.

In the preferred embodiment, the rotating insertion blade is formed as a disc and the edge of the rotating insertion blade is a continuous, outer circumferential edge.

The present invention provides a device for installing contraction joints in concrete slabs where a roll of tape, which is the insertion material, preferably sits on top of a rotating insertion blade, and the tape is folded immediately prior to insertion into fresh concrete by the insertion blade. In the preferred embodiment, the tape is wound on a roll and the roll is mounted on an axle with the roll receiving the axle. The axle is received in the slot of the fork such that the tape wound on the roll rests upon the rotating insertion blade.

In the preferred embodiment, the roll of tape rotates in a direction opposite to the rotation of the insertion blade. In an alternate embodiment, the roll of tape rotates in the same direction as the rotation of the insertion blade.

In a preferred embodiment, the tape wound on the roll is disposed between first and second side members, which make up a pair of forks, which are attached to the base, and the first and second side members are formed with first and second guide rails that bracket the tape wound on the roll.

The present invention also provides a device where the machine can be reconfigured to accommodate tapes of various widths. In one preferred form of the invention, the reconfiguration can be performed rapidly by sliding guide rail extenders over guide rails mounted on side members that bracket the roll of tape.

In an alternate embodiment, the reconfiguration is performed using parts already contained on the device. No parts, other than those on the machine, are required.

In one preferred embodiment of the present invention, the installer is provided with a parting blade that is attached to the base, and the parting blade reaches below the base and is aligned with the rotating insertion blade. The parting blade is placed in front of the insertion blade with respect to the direction of travel of the installer. The parting blade is preferably made with a pointed tip and the parting blade is preferably made with a sloping lower surface. These features enable the blade to cut through or push down other inserted tapes the installer may encounter.

In a preferred embodiment, the installer is formed with a narrow slot that can receive and frictionally hold the insertion tape taut while the device is moved above the concrete slab.

The present invention provides a device or installer that can be manually pushed or pulled across a plastic concrete slab with a pole or some other extending device that is releasably attached to the installer or the device can be propelled across a concrete slab by a propulsion device that is made part of the installer and has its own power source.

The present invention provides a method, and a connection made by that method, of continuously inserting tape partially wound on a roll below a top surface of a plastic concrete slab. According to the method of the present invention an installer is used that has a base that is formed so as to be supported by and to travel over the top surface of the plastic concrete slab. The installer also has a rotating insertion blade supported by the base, the rotating insertion blade reaching below the base and above the base, the rotating insertion blade having an edge. The installer also has a fork that is supported by the base, the fork being located above the rotating insertion blade, the fork preferably having a slot. According to the method of the present invention, the tape partially wound on the roll is mounted onto the axle with the roll receiving the axle. The tape has a distal end and opposed longitudinal side edges. The axle is placed into the slot of the fork such that the tape wound on the roll rests upon the rotating insertion blade. The distal end of the tape is then pulled over a portion of the edge of the rotating insertion blade, such that a portion of the edge of the rotating insertion blade contacts the tape between the opposed longitudinal side edges. The installer is then placed on the top surface of the plastic concrete slab such that the base of the installer rests on the top surface of the plastic concrete slab, and a portion of the rotating insertion blade is inserted below the top surface of the plastic concrete slab, and also a portion of the tape is inserted below the top surface of the plastic concrete slab. The portion of the tape that is inserted below the top surface of the plastic concrete slab becomes attached to the plastic concrete in the slab with which it is in contact. The installer is then driven over the plastic concrete slab, such that the rotating insertion blade rotates and thereby pulls tape from where the tape is wound on the roll and inserts further portions of the tape below the top surface of the concrete slab.

The present invention provides a method of installing contraction joints that occurs immediately after screeding of concrete and before bullfloating, floating, or troweling the concrete surface.

The present invention also provides a method where the tape for insertion into fresh concrete may be folded at most any point across the width of the tape. According to the present invention, the portions of the tape inserted below the top surface of the concrete slab are folded longitudinally such that a longitudinal fold in the tape is placed in the plastic concrete slab and the opposed longitudinal side edges of the tape are disposed above the longitudinal fold.

The present invention also provides a method of installing tape into a concrete slab where the portions of the tape inserted below the top surface of the concrete slab continuously extend between first and second side edges of the plastic concrete slab.

The present invention also provides a method where the tape for insertion can be non-waterproof paper, which allows for easy cutting or piercing when joints in the transverse direction are installed. The present invention also provides a method where the one tape that is already installed in the concrete slab can be pushed down deeper into the slab by the parting blade when joints in the transverse direction are installed. The present invention also provides a method where the tape for insertion is moisture vapor retarding material, which will create a contraction joint that retards moisture transmission through the contraction joint.

In the present invention the edges of the tape can be physically modified by holes, slits, notches, or other discontinuities or extensions or surface treatment so that adhesion to concrete is insured. In the present invention the holes, slits, or notches on each side of the folded tape are staggered along the length of the tape.

The present invention also provides a method of installing tape in a plastic concrete slab where a first tape, which is already installed in the plastic concrete slab, is pushed down by the device as a second transverse tape is installed. In an alternate embodiment of the invention the first tape that is already installed in the slab is not pushed down during installation of the second tape, but rather the second tape is installed above the first tape.

In the preferred form of the invention the tape is continuous in length and spans continuously from one edge of the concrete slab to its opposed edge, as discontinuous lengths of tape would not provide a moisture retarding barrier. Also, in the preferred form of the invention, the tape creates a continuous barrier so that water on top of the slab does not transfer through contraction joints to the bottom of the slab, which could wet the subsoil.

It is an object of the present invention to provide contraction joints in a concrete slab, the contraction joints being formed with a vapor retarding barrier such that cracks occurring at the contraction joints will have a vapor retarding barrier present that should prevent the transmission of moisture through the crack from above or below the slab.

It is an object of the present invention to provide a portable device for installing flexible tape as a contraction joint.

It is an object of the present invention to use only a single blade to install a flexible tape as a contraction joint in a plastic concrete slab.

In the preferred embodiment, the fork and the insertion blade are pivotly connected to the base, the edge of the insertion blade is formed with teeth and keels are provided on the base.

DETAILED DESCRIPTION OF INVENTION

Figure 1:
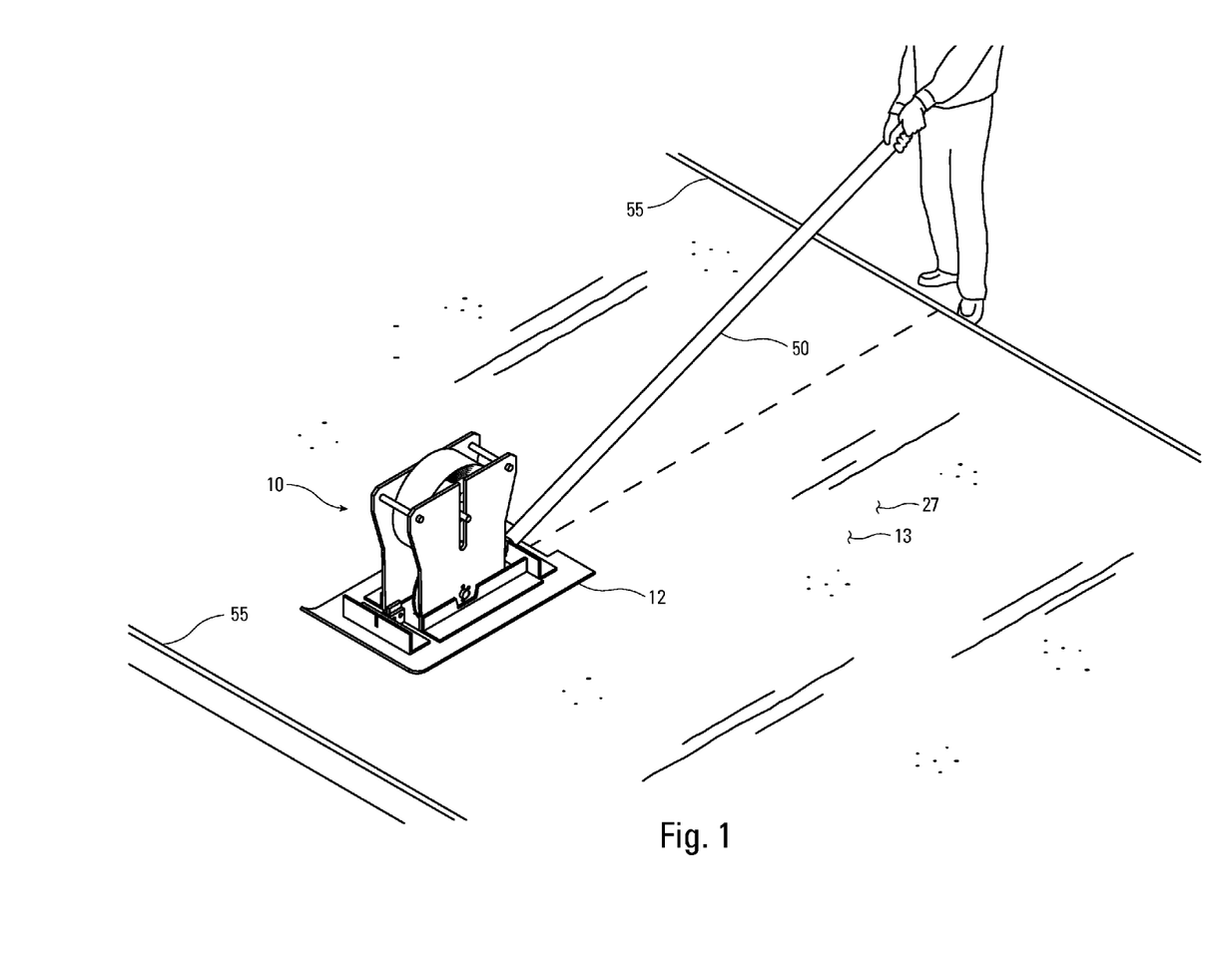
FIG. 1 is a perspective view of the installer of the present invention being pushed over the top surface of a plastic concrete slab.

FIG. 1 shows the installer 10 for continuously inserting tape 11 wound on a roll 34 below a top surface 27 of a plastic concrete slab 13. The installer 10 has a base 12 that is formed so as to be able be supported by and to travel over the top surface 27 of the plastic concrete slab 13. The installer 10 also has a rotating insertion blade 14 supported by the base 12. In the preferred embodiment, there is only a single rotating insertion blade 14. The rotating insertion blade 14 reaches below the base 12. The rotating insertion blade 14 has an edge 29. The installer 10 also has a fork supported 31 by the base 12. The fork 31 is located above the rotating insertion blade 14. The fork 31 has a slot 26 that can receive an axle 28 on which the tape 11 wound on the roll 34 may be received.

Figure 4:
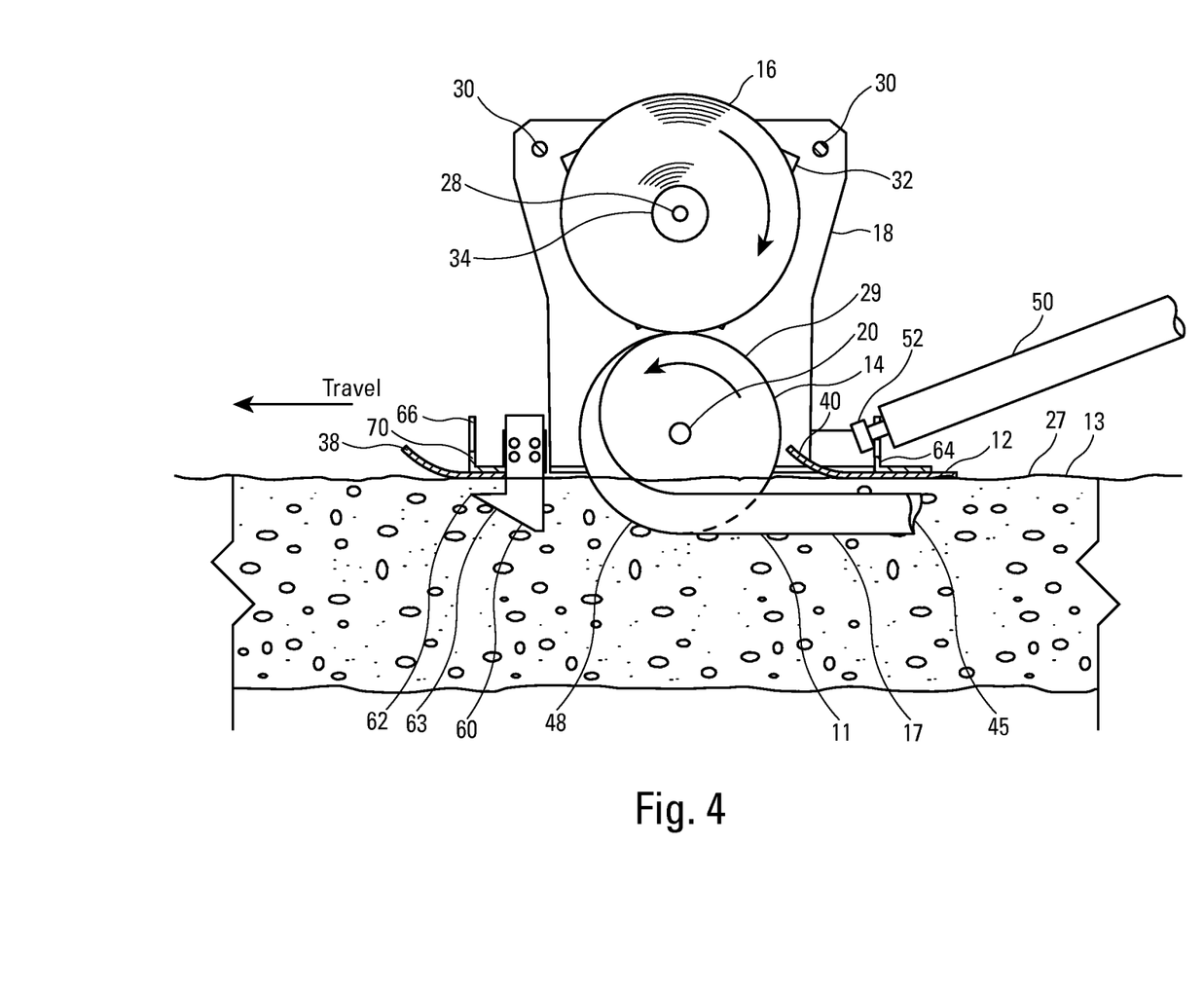
FIG. 4 is a side view of the installer of the present invention being pushed over the top surface of a plastic concrete slab by a pole. The plastic concrete slab is shown in a side sectional view so that the tape and the portions of the installer inserted into the plastic concrete slab can be seen.

Preferably, the rotating insertion blade 14 is formed as a disc and the edge 29 of the rotating insertion blade 14 is a continuous, outer circumferential edge 29. Also preferably, as shown in FIG. 4, the tape 11 wound on a roll 34 is mounted on an axle 28 with the roll 34 receiving the axle 28 and the axle 28 is received in the slot 26 of the fork 31 such that the tape 11 wound on the roll 34 rests upon the rotating insertion blade 14.

Figure 2:
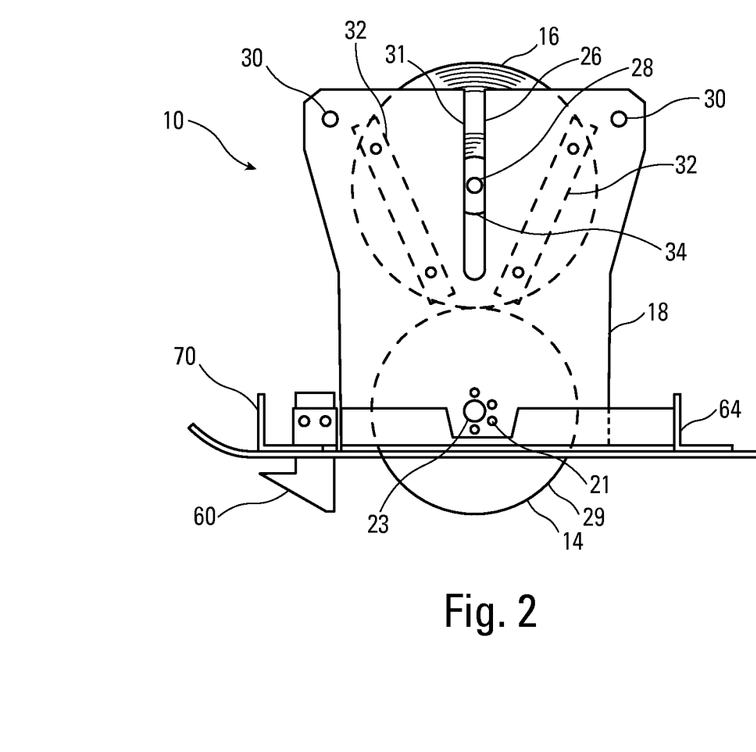
FIG. 2 is a side view of the installer of the present invention with portions of the rotating insertion blade and the roll of tape shown in dotted lines for clarity. The guide rails are also shown in dotted lines.
Figure 3:
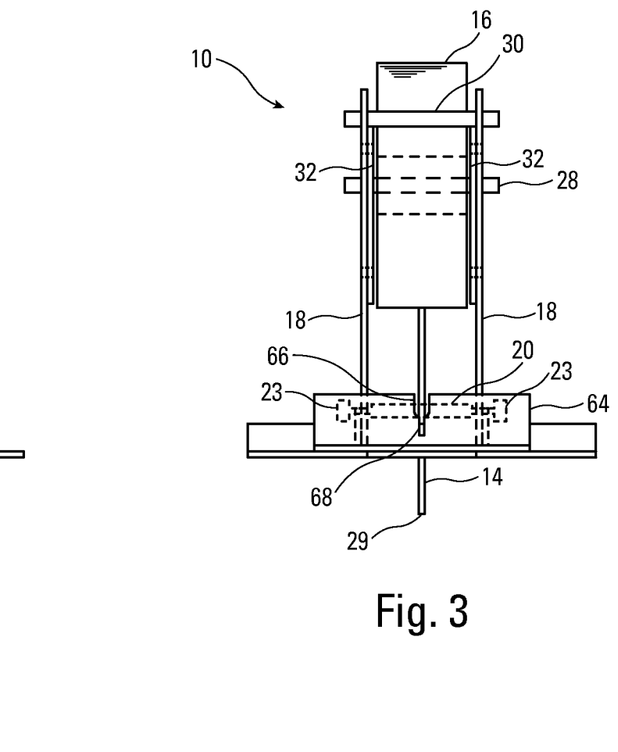
FIG. 3 is a rear view of the installer of the present invention with a roll of tape mounted on the installer.
Figure 6:
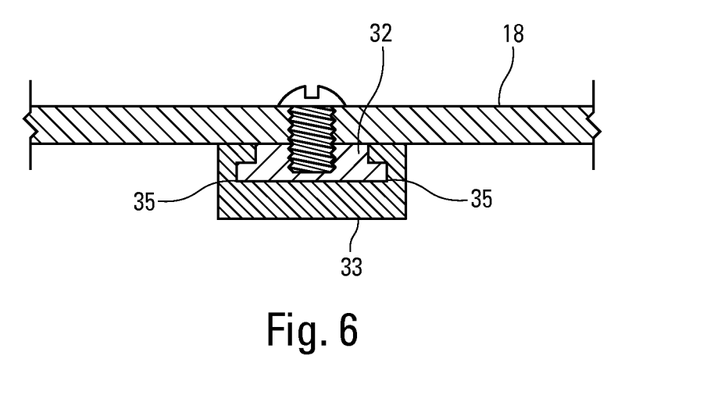
FIG. 6 is a detail sectional view of a side plate of the installer showing a cross section of a guide rail on the inside surface of the side plate.

In the preferred embodiment, as shown in FIG. 1, the tape 11 wound on the roll 34 is disposed between first and second side members 18, which are preferably side plates. As shown in FIGS. 2 and 3, in one preferred embodiment of the invention, the first and second side members 18 are formed with first and second guide rails 32 that bracket the tape 11 wound on the roll 34. As shown in FIG. 6, the first and second guide rails 32 can receive guide rail extensions 33 that fit over and partially encompass shoulders 35 on the first and second guide rails 32.

As shown in FIG. 2, in one preferred embodiment, a parting blade 60 is attached to the base 12, and the parting blade 60 reaches below the base 12 and is aligned with the rotating insertion blade 14. The parting blade 60 is preferably made with a pointed tip 62 projecting in the direction of travel of the installer 10, and the parting blade 60 is made with a sloping lower surface 63, the use of which is described later herein.

As shown in FIG. 3, the installer 10 is preferably formed with a narrow slot 68 that can receive and grasp the tape 11.

As is shown in FIG. 4, in one preferred embodiment of the invention, a pole 50 or other type of propulsion device can be releasably attached to the base 12 for driving the installer across the top surface 27 of the plastic concrete slab 13.

Figure 7:
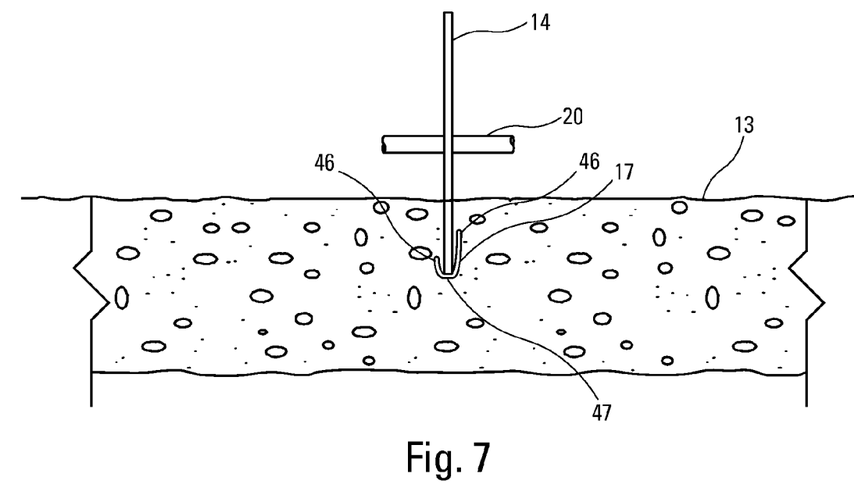
FIG. 7 is a schematic front view of the rotating insertion blade and its axis inserting a portion of folded tape into a plastic concrete slab

FIG. 4 also shows the connection made according to the present invention, wherein a tape 11 that is partially wound on a roll 34 has a distal end 45 and a leading portion 48 that are inserted below a top surface 27 of a plastic concrete slab 13. The tape 11 has opposed longitudinal side edges 46, and a portion of the tape is disposed along a portion of the edge of the rotating insertion blade 14 with the portion of the edge 29 of the rotating insertion blade 14 being disposed between the opposed longitudinal side edges 46 of the tape 11, resulting in a fold 47 being formed in the portion of the tape 11 that is disposed below the top surface 27 of the plastic concrete slab 13, as shown in FIG. 7.

FIG. 1 shows the invention in operation on a concrete slab. The installer 10 contains a base plate 12, which rides on the surface 27 of a newly placed concrete slab 13. A long-handled pole 50 is used to push the installer 10 across the slab.

FIG. 2 is a side view of the installer 10 and FIG. 3 is a rear view of the device. The basic components of the invention are a rotating insertion blade 14 and a roll of tape 16 mounted above, and riding on, the insertion blade 14. Side plates 18 serve two functions: to support the axis 20 of the insertion blade 14 and provide guide slots 26 for the axle or axis 28 of the roll of tape 16. The side plates 18 are attached to the base plate 12 by means of angles attached to the base plate. Because of the slots 26, the roll of tape 16 rides on the insertion blade 14 with gravity as the force for contact. The handles 30 are not only for lifting the device, but also function to maintain the proper spacing between sidewalls 18. Guide rails 32 are used to align or center the tape roll 16 over the insertion blade 14, and to assist the tape roll 16 in freely sliding downward as tape is consumed. In this manner, gravity maintains contact between the tape roll 16 and insertion blade 14.

FIG. 4 shows that the insertion blade 14 folds a single strip of tape 17, which feeds off of tape roll 16, just prior to inserting the tape into the fresh concrete 13. As shown in FIG. 4, for forward travel of the installer 10, the insertion blade 14 will rotate counterclockwise due to friction between the insertion blade and concrete. Proper mounting of the tape is such that the tape roll 16 rotates clockwise.

Figure 5:
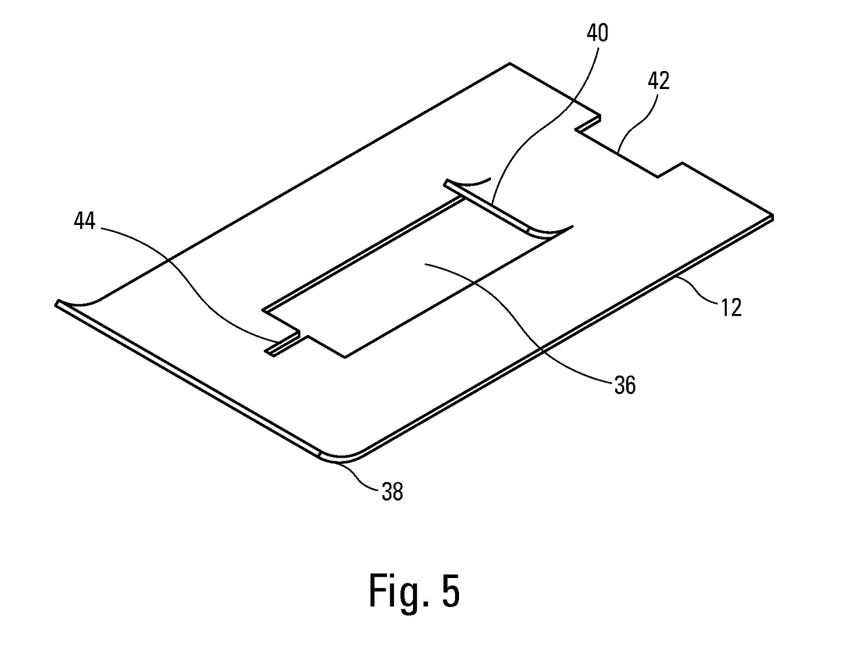
FIG. 5 is a perspective view of the base of the installer.

FIG. 5 shows that the base plate 12 to the device is preferably rectangular, and contains an open central area 36 where the insertion blade 14 extends into the concrete. The upturned edge 38 at the front of the device helps the base plate 12 to ride over rough surfaces of fresh concrete, and the upturned edge 40 at the rear of the open area 36 helps to push down concrete that is lifted by the rotating insertion blade 14. The notched area 42 at the rear of the base plate 12 assists in properly positioning the tape strip 17 when the installer 10 is placed on fresh concrete 13. The slot 44 at the front of the open area 36 is for the parting blade 60, shown in FIG. 4.

In FIG. 3, a push rail 64 is shown at the rear of the installer 10, which contains a wide slot 66 and narrow slot 68. The wide slot 66 is used to attach the long push pole 50. The connection between push pole 50 and the apparatus is a headed pin 52 at the end of pole 50 that slips into the wide slot 66, as shown in FIG. 4. Narrow slot 68 is used to temporarily hold the tape strip 17 as the device is manually moved above the surface of the plastic concrete slab 13 from one location to another.

The preferred embodiment of the device as described herein envisioned for application on slabs whose thickness ranges from 4 to 6 in., but of course its application is not limited to slabs with those thicknesses. In the preferred embodiment, the device base plate 12 is 12 in. wide by 20 in. long, and the sidewall 18 is 12 in. high. The insertion blade 14 is 7 in. diameter and has a thickness of about $1/16$ in. The tape roll 16 is about 8 in. diameter. The tape itself would range from 2 to 3 in. wide. Typically, a slab of 4-in. thickness would use 2-in. wide tape, and a 6-in. thick slab would use 3-in. wide tape. The tape would be folded in half by the insertion blade 14, so the contraction joint depth would be 1 in. for the 4-in. slab and 1.5-in. for the 6-in. slab. If the tape itself had a thickness of 6 mils, approximately 500 linear feet of tape would be available on roll 16. Preferred materials for the construction of the device are aluminum or magnesium for the base plate 12, and aluminum for other elements above the base plate, except for the insertion blade, which is steel.

In one preferred embodiment, the distance separating the sidewalls 18 is 3.5 in. The guide rails 32 are each slightly less than $1/4$ in. thick; hence, a tape roll 16 of 3 in. width freely slides between the guide rails 32. For tape rolls 16 narrower than 3-in., the guide rails are made wider by sliding guide rail extenders 33 over the guide rails. This is shown in FIG. 6. In this embodiment of the guide rails 32 and the extenders 33, the guide rails are formed as elongated members with a distal surface disposed away from the side walls 18 that is wider than the surface of the guide rail that is proximal the side walls 18. This creates shoulders which can be grasped by elongated tabs of the extenders 33.

FIG. 2 shows multiple holes 21 located in the sidewalls 18 at different heights to allow the insertion blade 14 to be embedded at different depths into the fresh concrete. Knobs 23 containing a short length of threaded rod, attach the axis 20 to the side plates 18. If the slab were 4 in. thick, the depth of the insertion blade is preferably set at 1.5 in. to accommodate the width of the folded tape 17 at 1 in. and placement of the tape below the surface of the concrete by 0.5 in. If the slab were 6 in. thick, the depth of the insertion blade would be 2.0 in. to accommodate the width of the folded tape at 1.5 in. and placement below the surface of 0.5 in. Inserting the tape below the surface of the concrete by 0.5 in. provides assurance that during finishing operations of bullfloating, floating, and troweling the surface of concrete, the tape will not be contacted.

The parting blade 60 serves several functions. First, it functions as a keel in assisting the installer 10 to track a straight line as the device is pushed across the slab. Second, the point 62 on the parting blade 60 can pierce existing tape 17 in a slab as new tape is placed perpendicular to the existing tape. Third, the blade 60 can push down existing tape in a slab as new tape is installed perpendicular to the existing tape, which operation will be discussed later. The depth of the parting blade 60 can be adjusted to accommodate different situations as needed.

A variation in the device is to have the tape folded off-center. In this way a 2-in. wide tape could be used in a 6-in. slab. The tape 17 would be folded off center, as shown in FIG. 7, such that one side is 1.5 in. wide and the other side is 0.5 in. wide. The guide rails 32 would be properly sized and installed to place the tape roll 16 off-center on the insertion blade 14.

Figure 11:
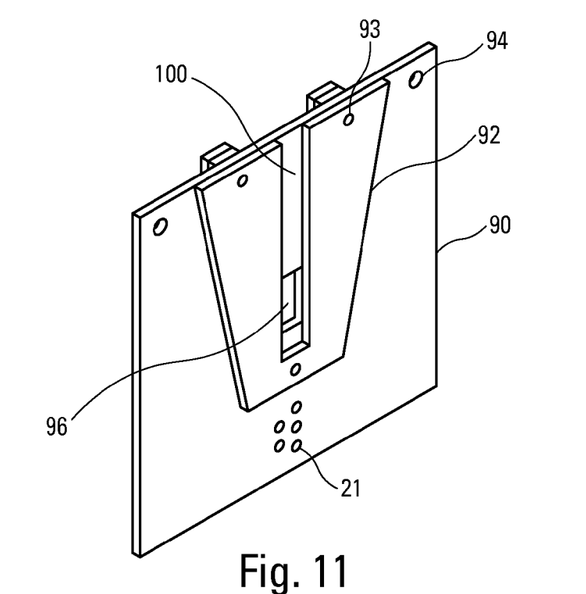
FIG. 11 is a perspective, inside view of an alternate side plate of the present invention with an alternate fork and guide members for the roll of tape.
Figure 12:
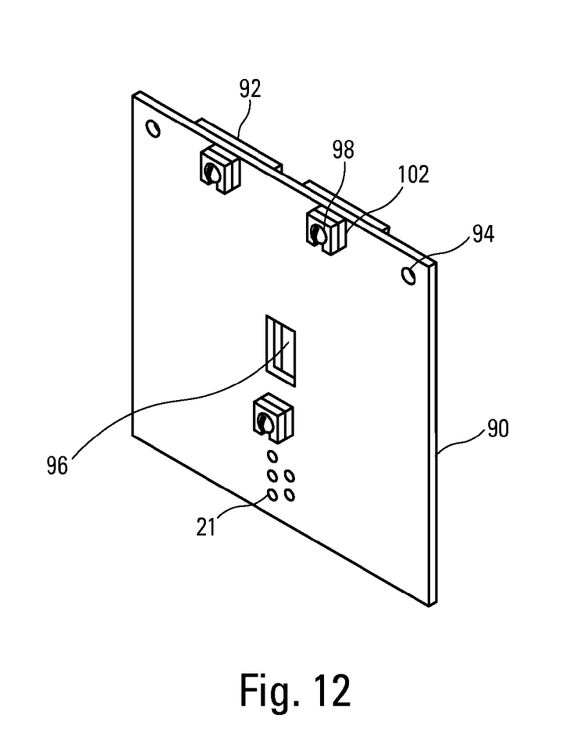
FIG. 12 is a perspective, outside view of an alternate side plate of the present invention with an alternate fork and guide members for the roll of tape.

In an alternate embodiment of the device, the side plates 18 are designed differently. FIGS. 11 and 12 show the alternate design for the side plate 18, shown here as an alternate side plate 90. FIG. 11 is the inside view of the alternate side plate 90, where tape roll 16 is located; and, FIG. 12 is the outside view. The original guide rail 32 in FIG. 2 is now shown as the alternate guide rail 92, which is attached to the alternate side plate 90 by machine screws 98. The attachment is by threaded holes 93 in the alternate guide rail 92. A view port 96 in the side of the alternate side plate 90 is provided to observe tape roll 16 as it nears being used up. Items of the same design as in FIG. 2 are the handle holes 94 for handles 30, and multiple holes 21 for attaching the insertion blade 14.

Figure 13:
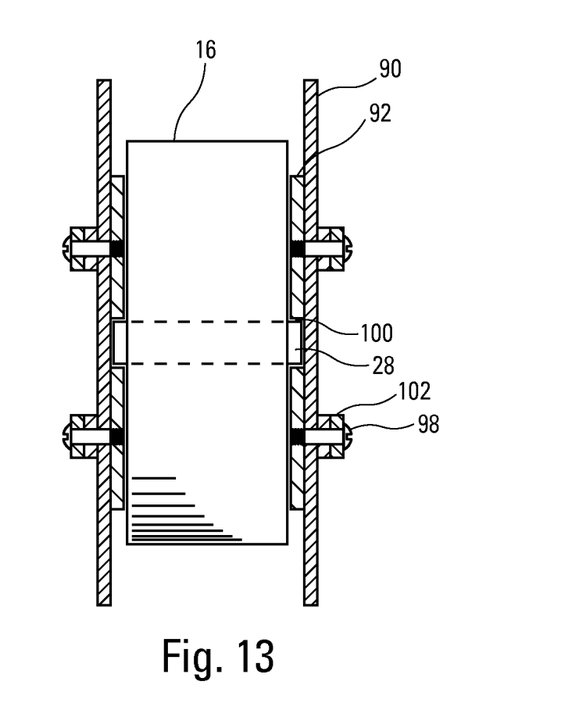
FIG. 13 is a top view of a form of the invention with alternate side plates forks and guide members holding the roll of tape.
Figure 14:
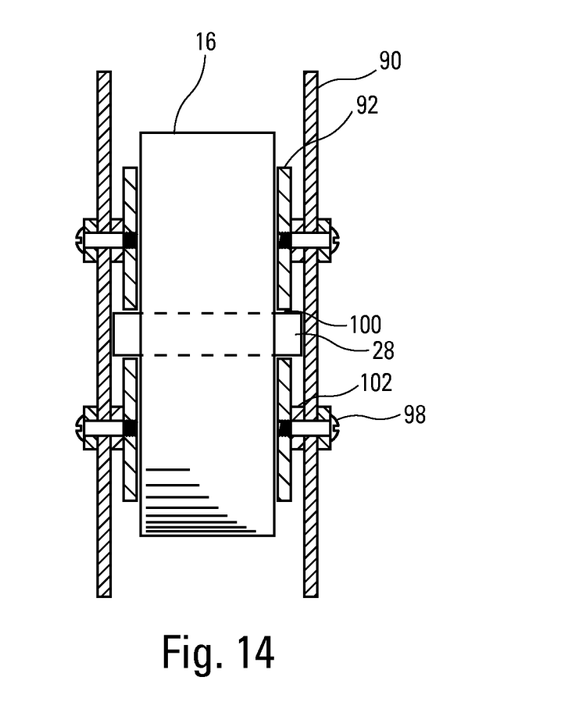
FIG. 14 is a top view of a form of the invention with alternate side plates forks and guide members holding the roll of tape.

FIG. 12 also shows slotted spacers 102 at each machine screw 98 location. The slotted spacers 102 are used to change the location of the alternate guide rail 92 when the roll of tape 16 is to be changed to a different width. FIG. 13 shows roll of tape 16 mounted between alternate guide rails 92 and alternate side plates 90. Axis 28 of tape roll 16 is located in guide slot 100. FIG. 14 is a similar view to that of FIG. 13 except the tape is narrower in FIG. 14, and the spacer 102 has been arranged accordingly.

Using specific dimensions, given earlier, for an installer device 10 intended for slabs of thickness 4 to 6 in., FIG. 13 shows tape 16 having a 3-in. width (which would be used in a slab of 6-in. thickness). FIG. 14 shows tape 16 having a 2.5-in. width (for a slab of 5-in. thickness). The change in tape width was a 0.5 in. decrease. The next reduction in tape width would be to 2-in. (for a slab of 4-in. thickness), or another 0.5 in. decrease. The alternate guide rails 92 need to be located closer together by these 0.5 in. increments. For this example, each slotted spacer 102 would be ¼ in. thick. At each machine screw attachment point, one slotted spacer 102 from outside the alternate side plate 90 would be moved between the alternate side plate 90 and alternate guide rail 92. This maneuver would shift the alternate guide rails 92 closer together by 0.5 in., or to a spacing of 2.5 in. Although not shown, the remaining slotted spacer 102 on the outside of alternate side plate 90 can be moved to the inside so the spacing between guide rails becomes 2.0 in. The advantage of this design is that all the pieces to reconfigure the installer 10 for different width tapes are present on the device. Separate pieces, which can get misplaced or lost, are eliminated. Also, the reconfiguration is done rapidly. The machine screws 98 are loosened, and then the slotted spacers 102 are slipped off machine screw posts, relocated, and slipped back over the machine screw posts, and then the machine screws are retightened.

Figure 15:
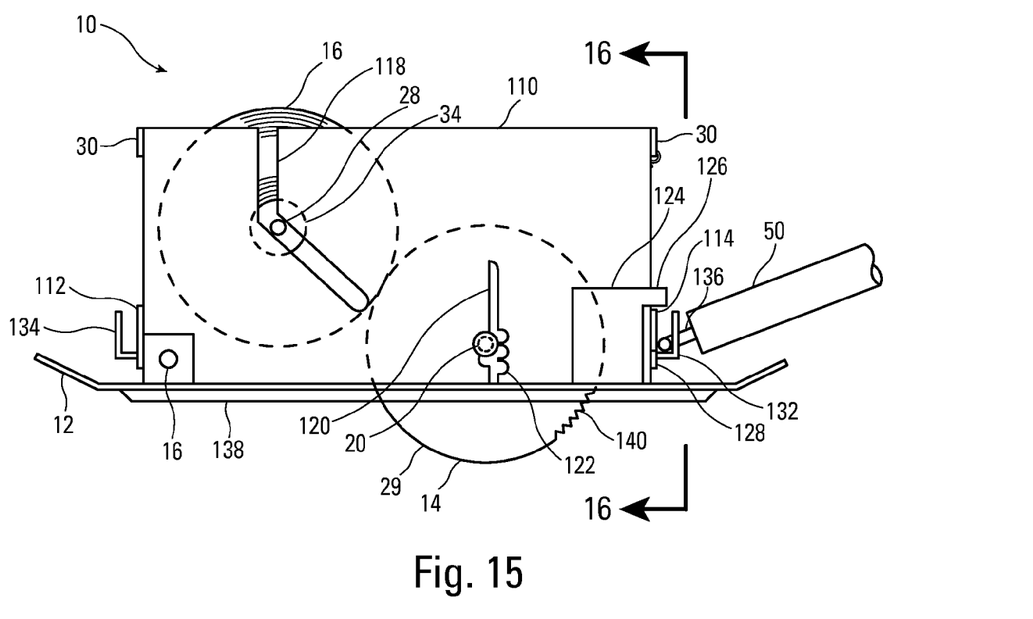
FIG. 15 is a side view of an alternate preferred embodiment of the installer.
Figure 16:
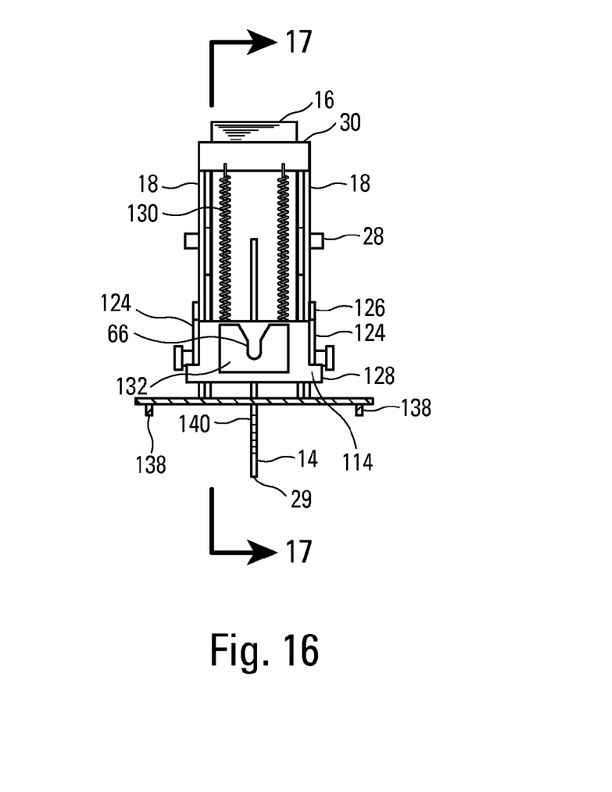
FIG. 16 is rear view of the installer shown in FIG. 15 without the pole.
Figure 17:
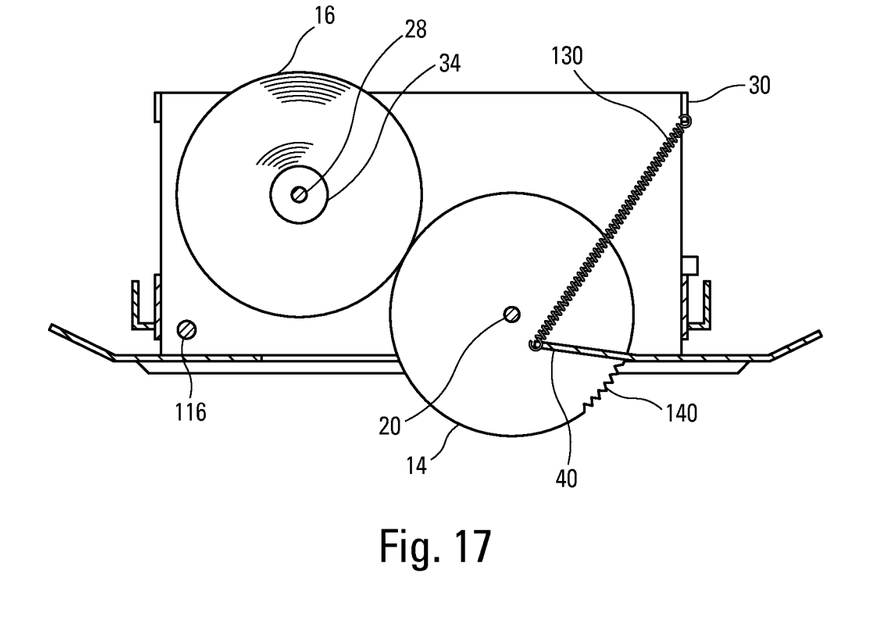
FIG. 17 is a side sectional view of the alternate preferred embodiment shown in FIG. 15, where the tape roll is shown riding on the side of the insertion blade. Also, the arrangement of the springs are shown.

An alternate preferred embodiment is shown in FIG. 15 through 17. The base plate 12 is configured similarly to that shown in FIG. 5. Mounted on the base plate 12 is box 110, which is comprised of two side plates 18, front end plate 112, rear end plate 114, and two handles 30. The box 110 is attached to the base plate by the pivot connection 116 at the front portion of the installer 10. Tape slot 118 is located in the front half of the installer 10 and permits the tape roll axis 28, which contains tape roll 16, to move by the force of gravity such that the tape roll 16 contacts and rides on the insertion blade 14. The elevation of tape axis 28 is always higher in than that of the insertion blade axis 20. The advantage of mounting the tape roll 16 such that the contact point is on the side of the insertion blade, as opposed to the top of the insertion blade 14, as shown in FIG. 2, is that tape 11 travels a shorter distance on the insertion blade before being inserted into the plastic concrete 13. Therefore, tape 11 is more stable in remaining centered on the insertion blade 14. The insertion blade 14 has sharp edges 29 or teeth 140 to assist in preventing sideways slippage of tape 11 off the center position on the insertion blade 14. In FIGS. 15, 16 and 17, the teeth 140 are shown as only disposed on a portion of the insertion blade 14, but ideally the teeth 140 would be disposed around the entire circumference of the insertion blade 14.

An insertion blade slot 120 is located in the rear half of box 110, which permits the insertion blade 14 to be inserted into plastic concrete 13 by various depths. The depths can be conveniently controlled by indents 122. The maximum height of slot 120 permits the insertion blade 14 to be raised above the base plate 12.

Attached to base plate 12 at the rear portion of installer 10 are guide plates 124, which horizontally confine the box 110, but vertically allow movement of the box 110. The height of vertical movement is limited to about 1.5 in. by the top stop 126, which is part of the guide plate 124. The bottom stop 128 is part of the rear end plate 114. Vertical movement of the box 110 permits the insertion blade 14 to ride over reinforcing bars embedded in plastic concrete, which are located higher in the slab than designated by design. When the box 110 rides over a reinforcing bar, the base plate 12 remains in contact with the plastic concrete 13.

Springs 130 are attached to the box 110 at the handle 30 and the up-turned edge 40 on the base plate 12. The springs 130 provide an extra force, which increases the effective weight of the box 110 such that a force almost equal to the total weight of the device is enrolled to push the insertion blade 14 into the plastic concrete 13. The extra force provided the springs 130 should not exceed the weight of the base plate 120 so as not to lift the base plate from the surface of the concrete when the box 110 is lifted up by the insertion blade 14 riding over a high piece of reinforcing bar in the concrete 13.

Figure 18:
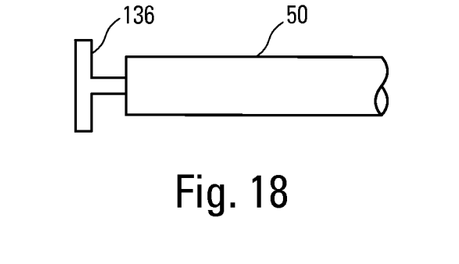
FIG. 18 is a top view of the T-headed pin.

The rear end plate 114 contains a push bracket 132, which contains a wide slot 66 to receive a headed pin 136 at the end of pole 50. The headed pin 136 is T shaped, such that confinement of the T portion by the push bracket 132, permits better steering of the installer 10 by horizontal movement of pole 50. The T shaped pin 136 permits free vertical movement of pole 50. FIG. 18 shows a configuration of the T shaped headed pin 136. At the front end of the installer 10 is a pull bracket 134 of similar configuration to that of the push bracket 132.

The keels 138 are provided, one along each side of the base plate 12, to assist the device moving along a straight path as pole 50 pushes or pulls.

Operation of Invention

The installer 10 is used in the following manner. Initially, a roll of tape 16 is placed on top of the insertion blade 14 in the fork 31 and then the distal end 45 of a single strip of tape 17 is run over the insertion blade 14 and then along the bottom of the device. The tape 11 has a distal end 45 and longitudinal side edges 46 and where the tape 11 is in contact with the edge 29 of the blade 14, it is disposed between the longitudinal side edges 46 of the tape 11. The edge 29 of the rotating insertion blade 14 is narrower than the tape 11, and as the blade 14 drives into the concrete the tape 11 folds around the edge 29 such that the portions of the tape 11 inserted below the top surface 29 of the concrete slab 13 are folded longitudinally such that a longitudinal fold 47 in the tape 11 is placed in the plastic concrete slab 13 and the opposed longitudinal side edges 46 of the tape 11 are disposed above the longitudinal fold 47.

Prior to placing the installer 10 on the top surface 27 of the concrete slab 13 and the initial insertion of the tape 11 into the concrete slab 13, if needed the tape can be inserted into slot 68 to hold it in place while the installer 10 is initially set in the plastic concrete slab 38, and once the device 10 is set, the tape is released from slot 68 and the distal end 45 of the tape is pushed into the plastic concrete slab by hand to the edge of the slab. After the device is placed on the surface of fresh concrete 13, typically a long-handled pole 50 is used to push the device forward, as shown in FIG. 1. Friction between the insertion blade and fresh concrete causes the insertion blade to rotate and the tape 11 adheres to the concrete in the slab 13. The insertion blade installs the folded tape into the concrete. The long-handled pole is attached to the device in such a manner that back and forth motion can be imparted to the device, which can facilitate the parting blade 60 and insertion blade 14 penetrating stiff concrete by displacing coarse aggregate particles. Under normal concreting conditions, the parting blade 60 and insertion blade 14 easily displace aggregate particles because the concrete will be highly workable at the time of installing the contraction joint.

Timing for insertion of the tape is immediately after screeding, or leveling-off the concrete surface. Screeding is conducted shortly after concrete is placed in the forms and while the concrete is still highly workable. This operation of installing contraction joints immediately after screeding, and before bullfloating the surface, is not performed by any other contraction joint method. Other methods install joints after bullfloating operations, or after final finishing operations. (Methods exist for placing contraction joints in formwork prior to placing concrete but these methods are not used in the field due to impracticality.) This early installation feature of the invention is highly advantageous, as the early installation of contraction joints provides the best protection against formation of random cracks. The joint is installed prior to bulk volume decreases of the plastic concrete slab. Bulk volume decreases are due to a several factors. There is initial chemical shrinkage, which occurs as fresh concrete stiffens and gains strength during the initial hours after water is introduced to portland cement. Later thermal contraction and autogenous shrinkage occur, and later still drying shrinkage takes place.

A novel feature of the device is that backward motion of the device is acceptable because the roll of tape 16 rides on the insertion blade 14. When backward motion occurs the single strip of tape 17 is rewound onto the roll 16. This action occurs only because the tape is mounted in such a manner that counter-clockwise rotation of the insertion blade 14 causes clockwise-rotation of the tape roll 16. FIG. 4 shows the proper method to mount the tape roll 16 over the insertion blade 14. Rewinding of tape onto the spool with backwards movement of the device is important because the tape strip 17 stays in full contact with the blade and remains centered or aligned on the blade. If the tape strip 17 were to become "loose", or separated from the insertion blade 14, then wind could catch the loose tape strip 17 and move it horizontally such that the blade is no longer located at the proper location on the tape.

Although the above description is the preferred embodiment, the invention can be built having the tape roll 16 and insertion blade 14 not touching, and where the tape strip 17 feeds off of the tape roll 16 such that the rotation of the tape roll 16 and insertion blade 14 are both counter-clockwise, or clockwise. For this alternative embodiment, however, the tape strip 17 will not rewind onto the tape roll 16 during backward movement of the device.

When the device arrives at the other side edge 55 of the slab, say 10 to 20 ft. away, preferably a second laborer picks up the device, cuts the tape strip 17, inserts the end of the tape 17, which is connected to the roll 16, into narrow slot 68, picks up and moves the device to the next joint location, places the device onto the concrete surface, disconnects the end of the tape 17 from the narrow slot 68, and pushes the device to the other side of the slab. The laborer can return to the first strip of tape 11 and push the partially embedded strip of tape 11 into the slab 13 to complete the contraction joint to the edge 55 of the slab 13. Thus, the portions of the tape 11 inserted below the top surface 27 of the concrete slab 13 continuously extend between first and second side edges 55 of the plastic concrete slab 13. This process of moving the device across the slab creates contraction joints in one direction, say the east-west direction. Contraction joints are also required in north-south direction. This invention discloses methods to install joint material perpendicular to already installed material, and these methods will be described shortly.

Slabs having widths of 30 to 40 ft. can have joints installed by the following procedure. Both laborers have long-handled poles 50. When the device is about 20 ft. away from the first laborer, who pushed the device, the second laborer attaches his pole 50 to the pull plate 70 at the front of the device and pulls the device. A wide slot 66 is located in the pull plate 70, similar to that of wide slot 66 in the push plate 64.

Remote propulsion of the device to traverse wide slabs is an alternative method of getting the device from one side of the formwork to the other side. A method like vibratory locomotion, as disclosed in U.S. Pat. No. 3,916,704, which is herein incorporated by reference, would provide propulsion device mounted on the device to provide the propulsion. This method uses a reciprocating weight, which would be mounted on a larger base plate 12 than proposed earlier, to cause the device to incrementally slide over the surface of fresh concrete. The reciprocation weight moves back and forth in a straight line that is inclined horizontally. As the weight reaches the top of its stroke, the effective weight of the device is reduced and the device slides forward; at the bottom of the stroke, the effective weight of the device is increased, which increases friction, and no back sliding occurs. In this manner, the installer incrementally moves across fresh concrete surfaces by remote control of a power source and the angle of inclination of the reciprocating weight. A use for remote propulsion of the contraction joint installer is for slabs constructed by the laser screed method, where slabs as large as 200×200 ft. can be placed in one day. Hence, the installer needs to traverse distances of 200 ft. in each direction.

For applications where the contraction joints do not require moisture-retarding characteristics, thin plastic or paper typically 1 to 6 mils (0.001 to 0.006 in.) thick can be used as the insertion material. These tapes typically do not function as moisture retarding materials. Thin plastic or paper tapes are inexpensive insertion materials. Non-waterproof paper can be used as an insertion material because the tape is inserted quickly, while the paper is still dry.

Figure 8:
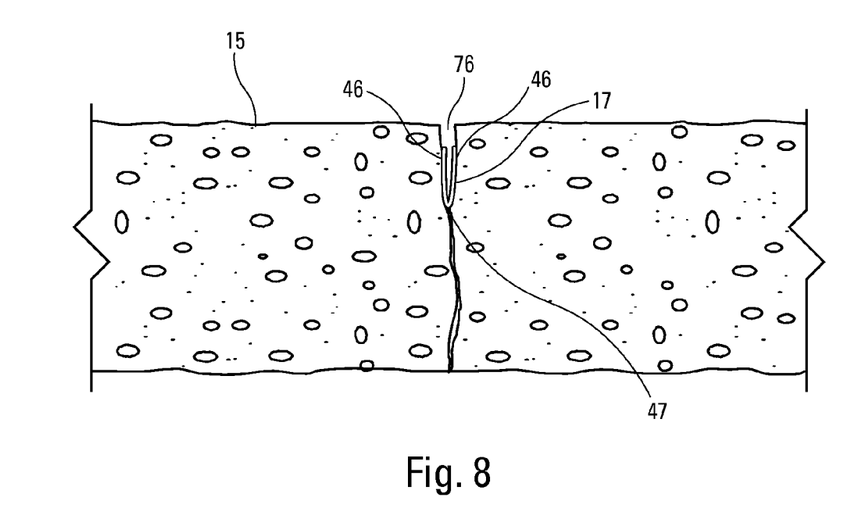
FIG. 8 is front sectional view of a hardened concrete slab with a portion of tape inserted according to the present invention with a crack formed in the concrete that runs from the bottom of the slab to the top of the slab with the tape serving as a barrier between the top and bottom portions of the crack due to the adhesion of the tape to the concrete on both sides of the crack.
Figure 9A:
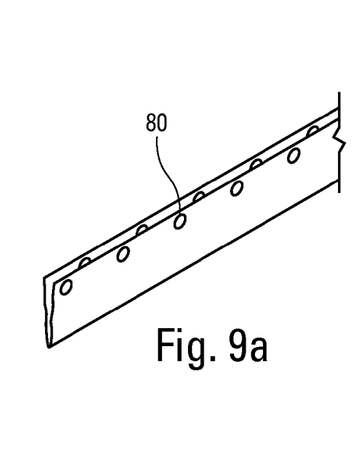
FIG. 9*a* is perspective view of a portion of tape with large holes disposed near the longitudinal side edges of the tape.
Figure 9B:
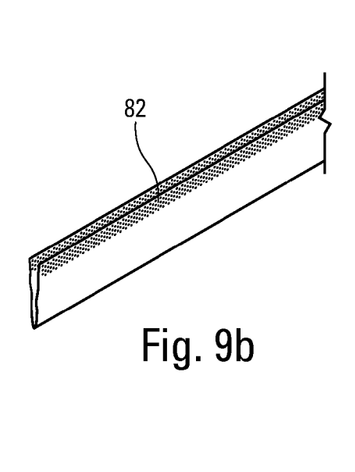
FIG. 9*b* is perspective view of a portion of tape with small holes disposed near the longitudinal side edges of the tape.
Figure 9C:
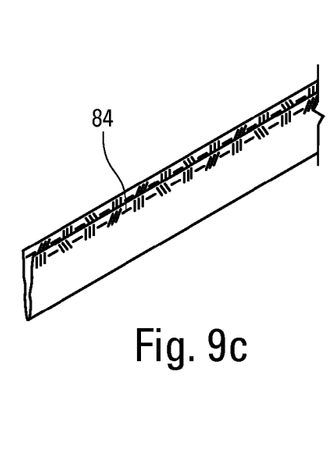
FIG. 9*c* is perspective view of a portion of tape with slits disposed near the longitudinal side edges of the tape.
Figure 9D:
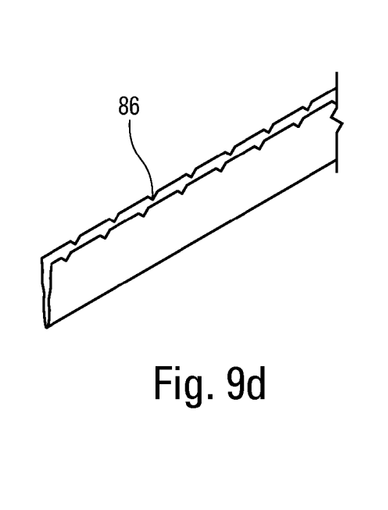
FIG. 9*d* is perspective view of a portion of tape with notches disposed in the longitudinal side edges of the tape.

For applications where contraction joints require moisture-retarder characteristics, plastic sheeting of 6-mil and greater thickness is available commercially with moisture transmission values of less than 0.1 permeance (perm.) Among other companies, Fortifiber Building Systems Group manufactures Moistop Ultra 6 and Ravens Engineered Films manufactures VaporBlock 6, where both products meet the 0.1 perm rating with plastic sheeting of 6-mil thickness. FIG. 8 shows that each side of the folded tape 17 needs to adhere to hardened concrete 15 after a crack 76 develops, so moisture vapor is blocked. FIG. 9 shows several methods to enhance and insure adhesion of tape 17 to concrete by providing discontinuities in and extensions from the tape 11. FIG. 9*a* shows large holes 80 (¼-inch diameter), while FIG. 9b shows numerous small holes 82 (like pin picks), located along the top edges of the folded tape 17. FIG. 9c shows slits 84 cut in the tape horizontally, vertically, and diagonally. FIG. 9d shows the top edges with notches 86 cut-out, where the notches are staggered. These methods permit fresh cement paste to run into holes, slits, or overlap the edge of the plastic tape and "grab" the top edge. Also, the surface of the tape 11 that is in contact with the concrete can be roughened to increase adhesion. Thus, a positive mechanism is provided to adhere each side of the tape to the concrete.

A unique application for plastic tape 17, which is adhered securely to concrete on each side of the tape, is for contraction joints in pavement. Conventional sawcut contraction joints in pavement allow rainwater to enter the joint, which results in a problem called "pumping". At the bottom of the crack at a contraction joint, water gets under the edges of pavement because curling of the pavement, due to drying shrinkage, has lifted the edges slightly. Whenever, a car or truck rolls over the contraction joint, the edge of the pavement is pushed down and water is pumped up and out of the joint. The water, which is pumped out, carries along fine soil particles from under the pavement, and eventually with sufficient cycles of pumping the edges are undermined. The pavement has now weak along the edges and cracking can occur due to traffic loads. This invention creates a barrier to rainwater reaching the bottom of the pavement, and thereby, the problem of pumping is mitigated.

During construction of buildings, slabs-on-ground may be built prior to constructing the superstructure. These slabs are exposed to rainwater before the superstructure is built. Should rainwater get under the slab by entering the contraction joints, the sand or soil under the slab will become wet and may present a moisture vapor emission problem after the superstructure is built and floor coverings are installed. This invention prevents the water placed on top of the slab from running into contraction joints and wetting the sand or soil beneath the slab.

For most concrete slabs, contraction joints are installed in both directions (north-south and east-west). Prior art by Lusk, U.S. Pat. No. 3,413,901 "Apparatus and Method for Inserting a Continuous and Solid Joint Strip into Plastic Concrete", Dec. 3, 1968, describes a method to accomplish this task. After the first joint material is installed, the second joint material, which is transverse to the first joint, is installed by using an attachment tool that pierces and cuts the first tape in order to make a path for the second tape. This approach can be used by the current invention when paper tape is used. An advantage of paper tape is that the first tape installed is exposed to a wet environment, that of the fresh concrete, and the paper tape will weaken as it absorbs water. The parting blade 60 with a point will easily cut the tape 17. This is not the situation if plastic tape were used, as puncturing and cutting plastic tape can be difficult.

Figure 10:
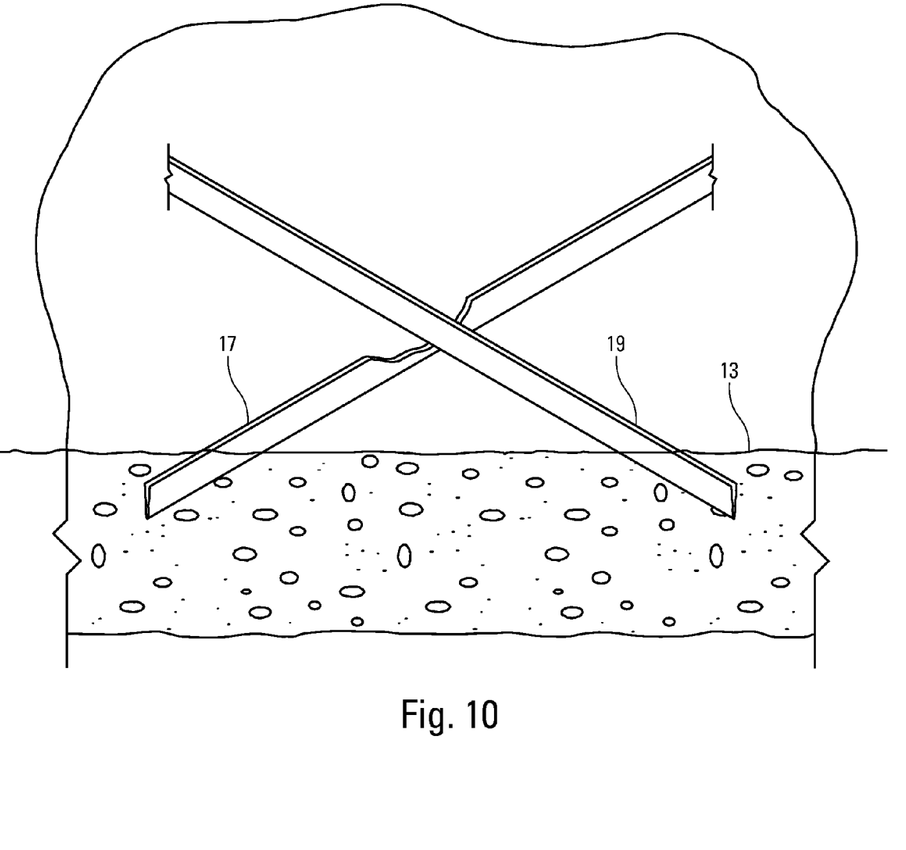
FIG. 10 is a perspective view of a portion of a concrete slab with portions of tape inserted into the slab according to the present invention with one tape having been inserted over the first tape inserted into the slab and the installer of the present invention having pushed the first tape so installed below the second tape so installed.

This invention uses a novel method to install the second tape transversely to the first tape. The method does not cut any tape, which is important for tapes used as moisture vapor retarders at contraction joints. The method is described as follows, and shown in FIG. 10. The first tape 17 is installed in the slab at a greater depth in the slab than typical, but above the reinforcing bars. For example for a 6-in. slab, the 1.5-in. folded tape 17 is inserted at a depth of 1.0 in. below the surface of the slab in the east-west direction. The second tape 19, in the north-south direction, gets inserted at a depth of 0.5 in. below the surface of the slab. As the second tape 19 is installed, the parting blade 60 pushed down the first tape 17. The parting blade is designed with a sloping surface of 30°, more or less, for the purpose of pushing down the first tape. If voids are created in the fresh concrete 13 by pushing down the first tape 17, the voids will be closed during the finishing operation of bullfloating, which immediately follows joint installation.

This method of installing joints in two directions can be performed where the first tape does not need to be pushed down by the second tape. Either the first tape is installed deeper in the slab, which can occur if the slab is unreinforced, or the tapes are narrower than the conventional ¼$^{th}$ the thickness of the slab, which is technically acceptable because the joints are installed at an early age.

I claim:

1. An installer for continuously inserting tape wound on a roll below a top surface of a plastic concrete slab, the installer comprising:
   a. a base that is formed so as to be able be supported by and to travel over the top surface of the plastic concrete slab;
   b. a rotating insertion blade supported by the base, the rotating insertion blade reaching below the base, the rotating insertion blade having an edge and an axis;
   c. a fork supported by the base, the fork being located higher than the axis of the rotating insertion blade, the fork having an opening that can receive an axle on which the tape wound on the roll may be received.

2. The installer of claim 1, wherein:
the rotating insertion blade is formed as a disc and the edge of the rotating insertion blade is a continuous, outer circumferential edge.

3. The installer of claim 2, wherein:
   a. the tape wound on the roll is mounted on an axle with the roll receiving the axle;
   b. and the axle is received in the slot of the fork such that the tape wound on the roll rests upon the rotating insertion blade.

4. The installer of claim 3, wherein:
the tape wound on the roll is disposed between first and second side members.

5. The installer of claim 4, wherein:
the first and second side members are formed with first and second guide rails that bracket the tape wound on the roll.

6. The installer of claim 5, wherein:
the first and second guide rails receive guide rail extensions.

7. The installer of claim 1, wherein:
a parting blade is attached to the base, and the parting blade reaches below the base and is aligned with the rotating insertion blade.

8. The installer of claim 1, wherein:
the installer has a narrow slot that can receive and grasp the tape.

9. The installer of claim 1, further comprising:
a pole releasably attached to the base for driving the installer across the top surface of the plastic concrete slab.

10. The installer of claim 1, further including:
a propulsion device mounted to the base for driving the installer across the top surface of the plastic concrete slab.

11. The installer of claim 1, wherein:
the tape wound on the roll is received on the axle and the axle is received in the opening of the fork, and the tape has opposed longitudinal sides edges and a portion of the tape is disposed along a portion of the edge of the rotating insertion blade with the portion of the edge of the rotating insertion blade being disposed between the opposed longitudinal side edges of the tape.

12. The installer of claim 1, wherein:
the installer has only a single rotating insertion blade.

13. The installer of claim 1, wherein:
the rotating insertion blade and the fork are pivotally connected to the base.

14. The installer of claim 1, wherein:
the base is provided with one or more keels.

15. The installer of claim 1, wherein:
the rotating insertion blade is formed as a disk and the edge of the rotating insertion blade is a continuous, outer circumferential edge having teeth thereupon.

16. The installer of claim 3, wherein:
the tape is not waterproof.

17. The installer of claim 3, wherein:
the tape is a moisture vapor retarder.

18. The installer of claim 3, wherein:
the tape has one or more of the following at or near the opposed longitudinal side edges of the tape: large holes, small holes, notches, slits, or a textured surface for contact with the concrete slab.

19. The installer of claim 3, wherein:
discontinuities are formed in portions of the tape to assist in the adhesion of the tape to the plastic concrete.

20. A method of continuously inserting tape partially wound on a roll below a top surface of a plastic concrete slab, the method comprising:
  a. providing an installer, the installer comprising:
    1. a base that is formed so as to be supported by and to travel over the top surface of the plastic concrete slab;
    2. a rotating insertion blade supported by the base, the rotating insertion blade reaching below the base and above the base, the rotating insertion blade having an edge and an axis;
    3. a fork supported by the base, the fork being located higher than the axis of the rotating insertion blade, the fork having an opening;
  b. mounting the tape partially wound on the roll onto an axle, the tape having a distal end and opposed longitudinal side edges, the roll receiving the axle;
  c. placing the axle into the slot of the fork such that the tape wound on the roll rests upon the rotating insertion blade;
  d. pulling the distal end of the tape over a portion of the edge of the rotating insertion blade, such that a portion of the edge of the rotating insertion blade contacts the tape between the opposed longitudinal side edges;
  e. placing the installer on the top surface of the plastic concrete slab such that the base of the installer rests on the top surface of the plastic concrete slab, and a portion of the rotating insertion blade is inserted below the top surface of the plastic concrete slab, and also a portion of the tape is inserted below the top surface of the plastic concrete slab, said portion of the tape inserted below the top surface of the plastic concrete slab becoming attached to the plastic concrete in the slab with which it is in contact;
  f. driving the installer over the plastic concrete slab, such that the rotating insertion blade rotates and thereby pulls tape from where the tape is wound on the roll and inserts further portions of the tape below the top surface of the concrete slab.

21. The method of claim 20, wherein:
the method of continuously inserting tape wound on a roll below a top surface of a plastic concrete slab is conducted immediately after the plastic concrete slab has been poured and the initial leveling operation of the top surface of the concrete slab has occurred.

22. The method of claim 20, wherein:
the method of continuously inserting tape wound on a roll into and below a top surface of a plastic concrete slab is conducted prior to any bullfloating of the top surface of the plastic concrete slab occurs.

23. The method of claim 20, wherein:
the portions of the tape inserted below the top surface of the concrete slab are folded longitudinally such that a longitudinal fold in the tape is placed in the plastic concrete slab and the opposed longitudinal side edges of the tape are disposed above the longitudinal fold.

24. The method of claim 20, wherein the step of driving the installer over the plastic concrete slab is continued until the installer reaches an edge of the slab; the method further comprising:
  a. lifting the installer off of the slab in a manner such that as the installer is lifted off of the slab the portions of the tape inserted below the top surface of the concrete slab remain anchored in the concrete slab which causes the tape to further unwind from where the tape is wound on the roll as the installer is lifted away from the slab creating a portion of free tape disposed between the portions of the tape inserted below the top surface of the concrete slab and any tape still wound on the roll;
  b. cutting this portion of free tape in such a manner that an appropriate portion of this free tape can be inserted below the top surface of the concrete slab.

25. The method of claim 20, wherein:
  a. the plastic concrete slab is formed with first and second side edges; and
  b. the portions of the tape inserted below the top surface of the concrete slab continuously extend between first and second side edges of the plastic concrete slab.

26. The method of claim 20, wherein the step of driving the installer over the plastic concrete slab further comprises:
pushing a tape already below the top surface of the plastic concrete slab deeper into the concrete slab.

27. The method of claim 20, wherein the step of driving the installer over the plastic concrete slab further comprises:
cutting a tape already below the top surface of the plastic concrete slab.

28. The method of claim 20, wherein:
the step of driving the installer over the plastic concrete slab is accomplished by using a pole releasably attached to the installer to drive the installer.

29. The method of claim 20, wherein:
the step of driving the installer over the plastic concrete slab is accomplished by using a propulsion device mounted on the installer.

30. The method of claim 20, wherein:
the tape is a moisture vapor retarder.

31. The method of claim 20, wherein:
the tape has one or more of the following at or near the opposed longitudinal side edges of the tape: large holes, small holes, notches, slits, or a textured surface for contact with the concrete slab.

32. The method of claim 20, wherein:
discontinuities are formed in portions of the tape to assist in the adhesion of the tape to the plastic concrete.

* * * * *